United States Patent
Vinay et al.

(10) Patent No.: US 9,922,120 B2
(45) Date of Patent: Mar. 20, 2018

(54) ONLINE LEARNING OF CLICK-THROUGH RATES ON FEDERATED SEARCH RESULTS

(75) Inventors: Vishwa Vinay, Cambridge (GB); Michael J. Taylor, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/593,759

(22) Filed: Aug. 24, 2012

(65) Prior Publication Data

US 2014/0059042 A1    Feb. 27, 2014

(51) Int. Cl.
*G06F 17/30* (2006.01)

(52) U.S. Cl.
CPC .............................. *G06F 17/30864* (2013.01)

(58) Field of Classification Search
CPC ............ G06F 17/3087; G06F 17/3089; G06F 17/30911
USPC ......................................... 707/723, 724, 748
See application file for complete search history.

(56) References Cited

U.S. PATENT DOCUMENTS

| | | | | |
|---|---|---|---|---|
| 6,792,416 B2 * | 9/2004 | Soetarman | ........ | G06F 17/30545 |
| 7,783,620 B1 * | 8/2010 | Chevalier | ........... | G06F 17/3053 |
| | | | | 707/706 |
| 8,332,397 B2 * | 12/2012 | Ramer | .............. | G06F 17/30867 |
| | | | | 707/723 |
| 8,359,311 B2 * | 1/2013 | Wang | ................ | G06F 17/30867 |
| | | | | 707/728 |
| 2003/0115193 A1 * | 6/2003 | Okamoto | .......... | G06F 17/30702 |
| 2006/0161534 A1 | 7/2006 | Carson, Jr. et al. | | |
| 2008/0201304 A1 | 8/2008 | Sue | | |
| 2009/0199115 A1 | 8/2009 | Singh | | |
| 2009/0234799 A1 * | 9/2009 | Betawadkar-Norwood | | G06F 17/30545 |
| 2009/0254572 A1 * | 10/2009 | Redlich | .................. | G06Q 10/06 |
| 2009/0265346 A1 | 10/2009 | Kadayam et al. | | |
| 2010/0306213 A1 | 12/2010 | Taylor et al. | | |
| 2011/0196875 A1 * | 8/2011 | Vadlamani | ........ | G06F 17/30707 |
| | | | | 707/748 |
| 2011/0258149 A1 | 10/2011 | Kanungo et al. | | |
| 2011/0295852 A1 | 12/2011 | Wang et al. | | |
| 2012/0221557 A1 * | 8/2012 | Edmonds | .......... | G06F 17/30864 |
| | | | | 707/723 |
| 2013/0080447 A1 * | 3/2013 | Ramer | .............. | G06F 17/30867 |
| | | | | 707/748 |

(Continued)

FOREIGN PATENT DOCUMENTS

| CN | 1856791 A | 11/2006 |
|---|---|---|
| CN | 101770483 A | 7/2010 |

OTHER PUBLICATIONS

Olivier Chapelle, "A Dynamic Bayesian Network Click Model for Web Search Ranking", Apr. 2009.*

(Continued)

*Primary Examiner* — Aleksandr Kerzhner
*Assistant Examiner* — Ahmed Abraham

(57) ABSTRACT

Online learning of click-through rates on search result blocks from one or more federated sources may be provided. Click-through feedback for the search result blocks may be received from the one or more federated sources in response to a query. Weights may be assigned to each of the search result blocks based on the received click-through feedback. The search result blocks may then be ranked based on the assigned weights. Finally, a search results page may be generated for displaying the ranked search results blocks to a user.

20 Claims, 7 Drawing Sheets

(56) References Cited

U.S. PATENT DOCUMENTS

| | | | | |
|---|---|---|---|---|
| 2013/0103680 A1* | 4/2013 | Arrasvuori | ............ | G06F 17/301 707/728 |
| 2013/0238594 A1* | 9/2013 | Hong | ................ | G06F 17/30867 707/710 |
| 2015/0381653 A1* | 12/2015 | Starink | ............... | H04L 63/1408 726/22 |

OTHER PUBLICATIONS

Arguello, Jaime, "Federated Search for Heterogeneous Environments", Retrieved on: May 25, 2012.*

Arguello, Jaime, "Federated Search for Heterogeneous Environments", Retrieved on: May 25, 2012, Available at: http://www.lti.cs.cmu.edu/research/thesis/2011/jaime_arguello.pdf.

Chapelle, et al., "A Dynamic Bayesian Network Click Model for Web Search Ranking", In Proceedings of the 18th International Conference on World Wide Web, Apr. 20, 2009, 10 pages.

Pradhan, et al., "Searching Online Resources in New Discovery Environment: A State-of-the-Art Review", In Proceedings of the 8th International Convention on Automation of Libraries in Education and Research, Mar. 2, 2011, 14 pages.

Arguello, et al., "Classification-Based Resource Selection", In Proceedings of the 18th ACM Conference on Information and Knowledge Management, Nov. 2, 2009, 10 pages.

Graepel et al., "Web-Scale Bayesian Click-Through Rate Prediction for Sponsored Search Advertising in Microsoft's Bing Search Engine," Proceedings of the 27th International Conference on Machine Learning, Haifa, Israel, 2010, 8 pages.

Diaz et al., "Adaptation of Offline Vertical Selection Predictions in the Presence of User Feedback," SIGIR '09, Jul. 19-23, 2009, Boston, Massachusetts, USA, 2009, 8 pages.

Arguello et al., "Sources of Evidence for Vertical Selection," SIGIR '09, Jul. 19-23, 2009, Boston, Massachusetts, USA, 2009, 8 pages.

Kumar et al., "On Composition of a Federated Web Search Result Page: Using Online Users to Provide Pairwise Preference for Heterogeneous Verticals," WSDM '11, Feb. 9-12, 2011, Hong Kong, China, 2011, 10 pages.

PCT International Search Report dated Jul. 25, 2014 cited in Application No. PCT/US2013/055631, 12 pgs.

European Extended Search Report in Application 13753488.9, dated Mar. 3, 2016, 8 pages.

PCT International Preliminary Report on Patentability in PCT/US2013/055631, dated Feb. 24, 2015, 8 pages.

European Communication in Application13753488.9, dated Dec. 23, 2016, 7 pgs.

"Office Action Issued in Chinese Patent Application No. 201380043987.9", dated Mar. 28, 2017,15 Pages.

Xing, et al., "Personalized meta-search engine model research", In Journal of the Computer Engineering and Applications, vol. 44, Issue 36, Dec. 21, 2008, pp. 150-152.

Jindong, Wang, "Research on the Scheduling Strategy of meta Search Engine and Results Ranking Algorithm", Chinese Master's Theses full-text database Information Technology, with English abstract, Aug. 15, 2010, pp. I138-I970 (76 pgs. total).

* cited by examiner

ONLINE LEARNING OF CLICK-THROUGH RATES ON FEDERATED SEARCH RESULTS

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Online search systems utilized by an enterprise may be configured to submit internal search queries (e.g., intranet queries) as well as external queries (e.g., web search queries) to various federated sources. Federated sources may include third party websites which are external to the enterprise. In addition, these federated sources may include websites which are unknown with respect to a preexisting configuration of an enterprise search engine used for ranking results from internal search queries. For example, an enterprise consisting of an e-commerce website may often be required to submit queries to multiple external financial sources for data associated with various financial transactions. Since the enterprise search engine is not configured for ranking search results from unknown federated sources, the enterprise has no way of determining the best results returned from the queries relative to regular results. As a result, users may be required to manually peruse through numerous federated search results and rank them in order to determine which are the best results. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for online learning of click-through rates on search result blocks from one or more federated sources. Click-through feedback for the search result blocks may be received from the one or more federated sources in response to a query. Weights may be assigned to each of the search result blocks based on the received click-through feedback. The search result blocks may then be ranked based on the assigned weights. Finally, a search results page may be generated for displaying the ranked search results blocks to a user.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for online learning of click-through rates on search result blocks from one or more federated sources. Click-through feedback for the search result blocks may be received from the one or more federated sources in response to a query. Weights may be assigned to each of the search result blocks based on the received click-through feedback. The search result blocks may then be ranked based on the assigned weights. Finally, a search results page may be generated for displaying the ranked search results blocks to a user.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
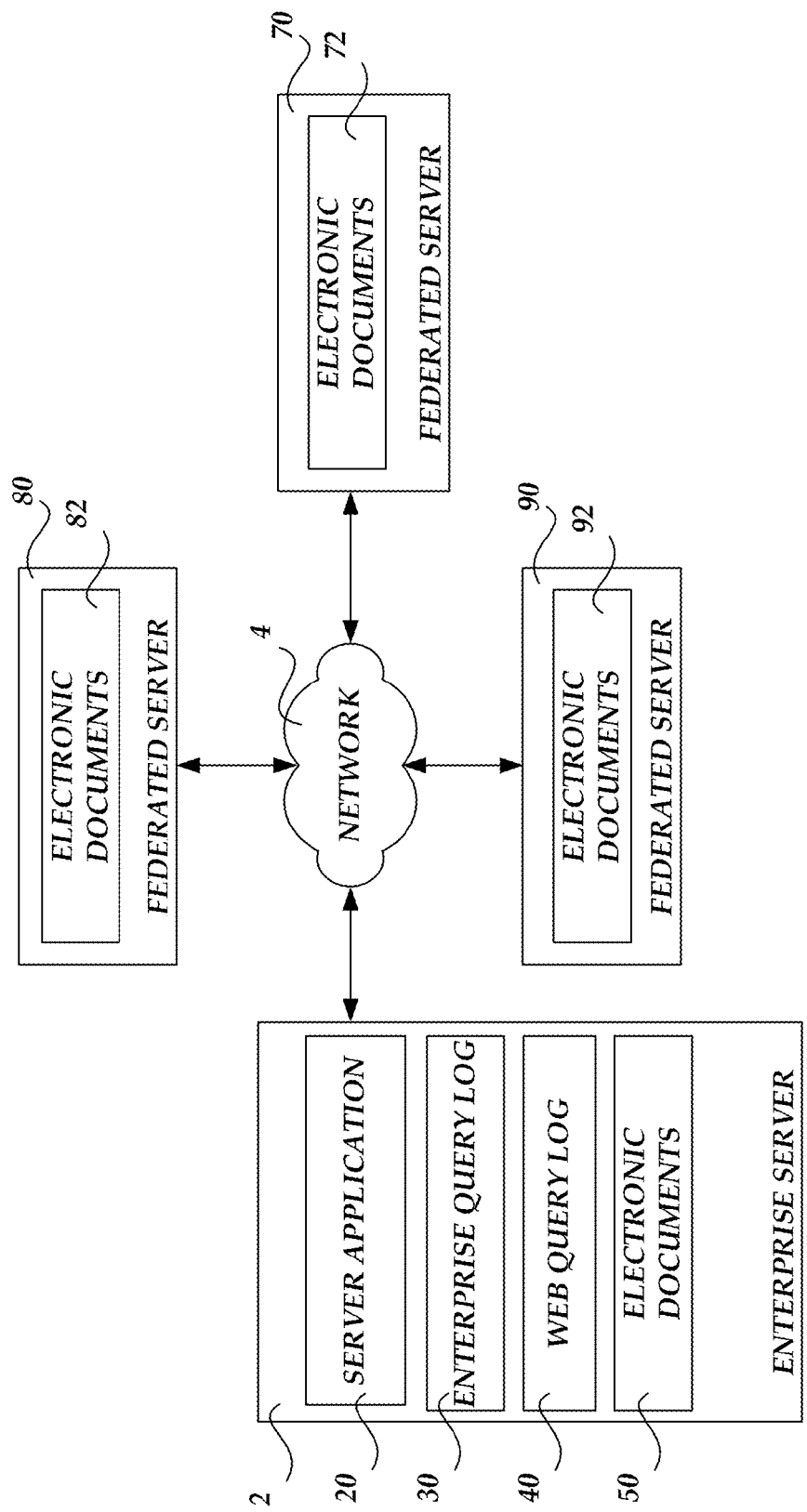
FIG. 1 is a block diagram illustrating a network architecture for online learning of click-through rates on federated result blocks from federated sources, in accordance with various embodiments.

Referring now to the drawings, in which like numerals represent like elements through the several figures, various aspects of the present invention will be described. FIG. 1 is a block diagram illustrating a network architecture for online learning of click-through rates on federated result blocks from federated sources, in accordance with various embodiments. The network architecture includes an enterprise server computer 2 (hereinafter referred to as "enterprise server 2") in communication with federated server computers 70, 80 and 90 ("hereinafter referred to as "federated servers 70, 80 and 90") over a network 4. The network 4 may include a local network or a wide area network (e.g., the Internet). In accordance with an embodiment, the enterprise server 2 may be configured to support a service for a business enterprise to generate queries for searching electronic documents from sources located within the enterprise (e.g., electronic documents 50 stored on the enterprise server 2) and external to the enterprise (e.g., electronic documents 72, 82 and 92 which may be stored on the federated servers 70, 80 and 90, respectively) and presenting the "top" query results on a results page (e.g., a web page) for review by a user. It should be understood that, in accordance with an embodiment, the federated servers 70, 80 and 90 may comprise unknown sources with respect to the enterprise server 2. In particular, in the absence of the embodiments described herein, the federated servers 70, 80 and 90 may comprises sources which are "a priori" unknown sources such that best search results returned in response to queries made to these sources by the enterprise server 2 are unable to be determined and ranked relative to regular search results. In addition to the electronic documents 40, the enterprise server 2 may further store a server application 20, an enterprise query log 30 and a web query log 40. As will be discussed in greater detail below with respect to FIG. 3 and in accordance with an embodiment, the server application 20 may be configured to facilitate online learning of click-through rates on federated result blocks from unknown federated sources by utilizing a click-prediction algorithm such that best search results may determined and then ranked. In accordance with an embodiment, the server application 20 may comprise enterprise application software with an integrated web application platform which may be utilized to provide intranet portals, document and file management, collaboration, social networks, extranets, websites, enterprise search, and business intelligence. An illustrative integrated web application platform is the SHAREPOINT web application platform developed by MICROSOFT CORPORATION of Redmond, Wash. It should be understood, however, that other web application platforms from other manufacturers may also be utilized without departing from the spirit and scope of the embodiments described herein.

Figure 2:
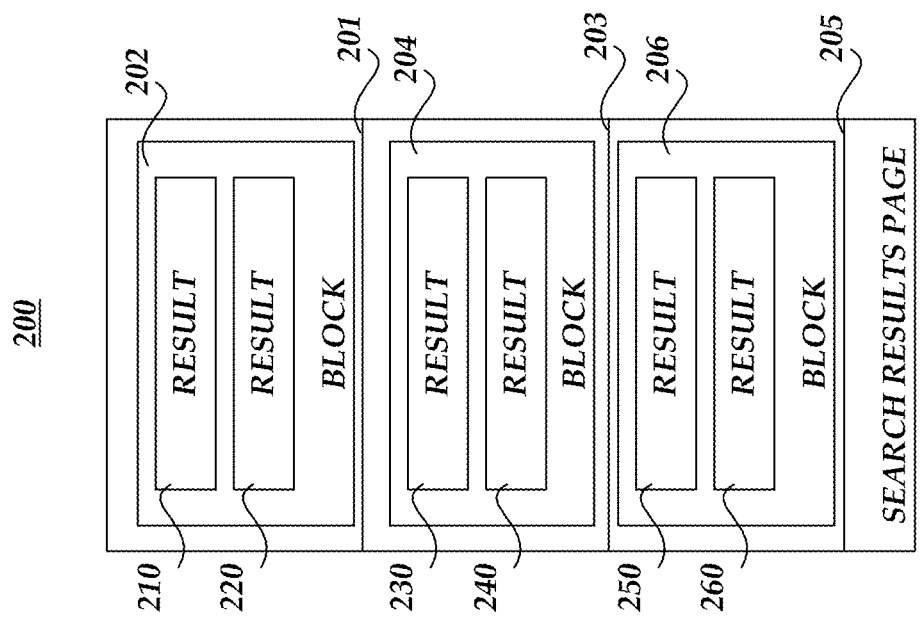
FIG. 2 is a block diagram illustrating a search results page showing ranked federated result blocks from federated sources, in accordance with an embodiment.

FIG. 2 is a block diagram illustrating a search results page 200 showing ranked federated result blocks from federated sources, in accordance with an embodiment. The search results page 200, which may be generated by the server application 20 of FIG. 1, may include federated result blocks 202, 204 and 206 which are separated by slots 201, 203 and 205, respectively. The federated result block 202 may include Results 210 and 220, the federated result block 204 may include Results 230 and 240 and the federated result block 206 may include Results 250 and 260. As defined herein, a federated result block is a set of documents from a federated source (i.e., the federated servers 70, 80 and 90 of FIG. 1). Thus, in accordance with an embodiment, the federated result blocks 202, 204 and 206 may represent sets of electronic documents (represented by the Results 210-270) from the federated servers 70, 80 and 90 (i.e., the federated sources) of FIG. 1, respectively. In accordance with another embodiment, the federated result blocks 202, 204 and 206 may be from the same source such that the correspond to a reinterpretation of a search query generated by the server application 20. For example, a search query which includes an electronic document name having a file extension (e.g., ".doc") may be reinterpreted as a request to return only search results having the same file extension. As will be described in greater detail below with respect to FIG. 3, the federated result blocks 202, 204 and 206 may be ordered such that they represent a ranking of the best search results returned from a search query. Thus, the federated result block 202 displayed in the slot 201 at the top of the search results page 200 is ranked higher than the federated result block 204, which is ranked higher than the federated result block 206. As will be discussed in greater detail herein, the display order of the federated result blocks 202, 204 and 206 may be determined according to threshold weights corresponding to each of the slots 201, 203 and 205. In accordance with an embodiment, the server application 20 may be configured to determine a weight for each of the federated result blocks 202, 204 and 206 which is between 0 and 1. The weights may be determined based on click probabilities (i.e., the likelihood that a federated result block will be clicked on by a user on a search engine web page) calculated by the server application 20. Thus, federated result blocks having weights above a certain threshold value (i.e., 0.5) will be displayed at the top of the search results page 200 in the slot 201 while federated result blocks having weights below the threshold value will be displayed in the slots 203 and 205 in the search results page 200. It should be understood that number of the results appearing in a federated result block may be user configurable. Therefore, while the federated result blocks 202, 204 and 206 are shown as having two search results per block, a user of the server application 20 may configure a federated result block to display any number of search results.

Figure 3:
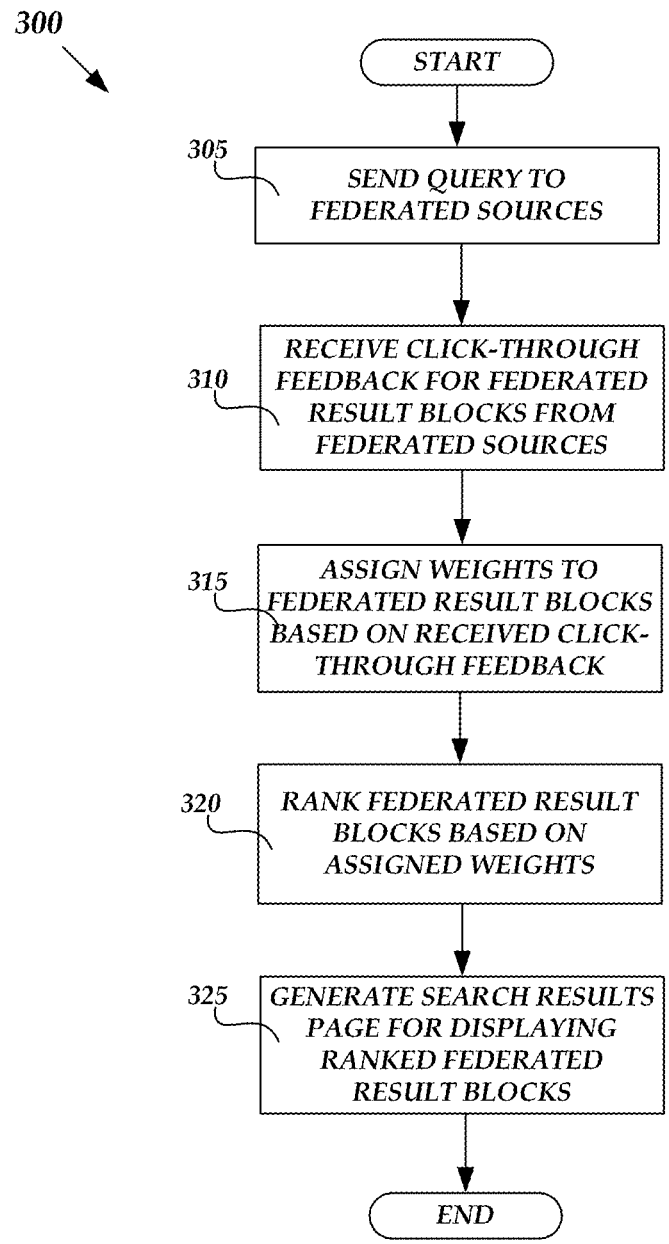
FIG. 3 is a flow diagram illustrating a routine for online learning of click-through rates on federated result blocks from federated sources, in accordance with an embodiment.

FIG. 3 is a flow diagram illustrating a routine 300 for online learning of click-through rates on federated result blocks from federated sources, in accordance with an embodiment. When reading the discussion of the routine presented herein, it should be appreciated that the logical operations of various embodiments of the present invention are implemented (1) as a sequence of computer implemented acts or program modules running on a computing device or system, and/or (2) as interconnected machine logical circuits or circuit modules within the computing device or system. The implementation is a matter of choice dependent on the performance requirements of the computing device or system implementing the invention. Accordingly, the logical operations illustrated in FIG. 3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the server application 20 executing on the enterprise server 2 may send a query to one or more federated sources. For example, a user of the server application 20 may generate and send a query for a certain type of financial document to multiple unknown federated sources (such as the federated servers 70, 80 and 90) for use by an e-commerce web site hosted by the enterprise server 2. It should be appreciated that, in accordance with another embodiment, the query may be sent to a single federated source.

From operation 305, the routine 300 continues to operation 310, where the server application 20 executing on the enterprise server 2 may receive click-through feedback for federated result blocks from one or more federated sources in response to the query made to the federated sources at operation 305. It should be understood that the click-through feedback may comprise a click-through rate (e.g., the popularity of a federated result block) on the federated result blocks (which include search results) returned from the query. In accordance with an embodiment, when the federated sources are unknown, a click probability (e.g., the likelihood that a federated result block will be clicked on by a user on a search engine web page) for each of the federated result blocks may be calculated by the server application 20 to predict the click-through rate. In particular, the click probability may be determined utilizing a Bayesian click-through rate (CTR) prediction online learning algorithm (i.e., for the prediction of binary outcomes). In accordance with an embodiment, the algorithm may be based on a probit regression model that maps discrete or real-valued input features to probabilities. The algorithm may further maintain Gaussian beliefs over weights of the model and perform Gaussian online updates derived from approximate message passing. Scalability of the algorithm is ensured through a principled weight pruning procedure and an approximate parallel implementation. An illustrative algorithm which may be utilized with the various embodiments described herein is shown below:

$$x_i := \begin{pmatrix} x_{i,1} \\ \vdots \\ x_{i,M_i} \end{pmatrix}, \sum_{j=1}^{M_i} x_{i,j} = 1.$$

With respect to the above equation an interval [0,1] may be utilized to represent the set of possible CTRs (probabilities of click) where $x_i$ represents a binary 1-in-N encoding of a corresponding discrete feature value such that each vector $x_i$ has exactly one element with value 1 and the remaining values 0. The aforementioned algorithm is described in greater detail in Graepel, T., Candela, J. Q., Borchert, T. and Herbrich, R., "Web-Scale Bayesian Click-Through Rate Prediction for Sponsored Search Advertising in Microsoft's Bing Search Engine," Proceedings of the 27th International Conference on Machine Learning., Haifa, Israel, 2010, the disclosure of which is incorporated herein, in its entirety, by reference.

In accordance with an embodiment, the CTR algorithm may be utilized to determine the click probability of one or more unknown federated result block features including, without limitation, a block type ID, a query ID, a block rank and a block size. Illustrative block types may include "Base," "BestBets," "PersonalNav," "Definitions," "BestBetQueryTransform," "People," "AuthoredBy" and Sites. The server application 20 may be configured to utilize the block type ID and query ID features to memorize how a particular block type did for a particular query which may be utilized for online adaptation. The block rank feature represents a rank order position on a Search Engine Results Page ("SERP"). The block rank may be initially set to "1" for prediction. The lower down the SERP a block rank is, the smaller the click probability will be for a federated result block. The block size feature represents the number of results in a block. A larger number of results will result in a higher click probability.

It should be understood that the SERP, referenced above, is the final page presented to a user issuing a search query. Thus, given a set of candidate blocks (e.g., federated result blocks), predictions for their CTR can be made as discussed above. The SERP may then be assembled so as to attempt to maximize the likelihood that the user will click a block higher up on the result page. It should further be understood that it this point, it may further be possible to introduce business logic that overrides the predicted CTR to impose requirements for certain federated result blocks to be placed at certain positions on the SERP (e.g. "BestBets" always being placed at the top of the SERP).

It should be understood that in accordance with another embodiment, the click probability may be boosted for frequently used query terms on the enterprise server 2. In particular, the server application 20 may be configured to check the enterprise query log 30 the web query log 40 (shown in FIG. 1) to determine a frequency of one or more query terms. Frequently used query terms appearing in both logs may be utilized to boost a click probability for a federated result block.

From operation 310, the routine 300 continues to operation 315, where the server application 20 executing on the enterprise server 2 may assign weights to federated result blocks based on received click-through feedback. In particular, the server application 20 may assign a weight to each of the federated result blocks 70, 80 and 90 based on the click probability calculated for each block as discussed above.

From operation 315, the routine 300 continues to operation 320, where the server application 20 executing on the enterprise server 2 may rank federated result blocks based on the weights assigned at operation 315. In particular, the federated result blocks may be ranked based on a predetermined threshold weight so that they may be displayed in predetermined slots on a search results page such as described above with respect to FIG. 2.

From operation 320, the routine 300 continues to operation 325, where the server application 20 executing on the enterprise server 2 may generate a search results page for displaying the federated result blocks which were ranked at operation 320. In particular, as discussed above with respect to FIG. 2, each of the ranked federated blocks may correspond to an unknown federated source. Alternatively, the ranked federated result blocks may be from the same source and correspond to a reinterpretation of a search query generated by the server application 20. From operation 325, the routine 300 then ends.

Figure 4:
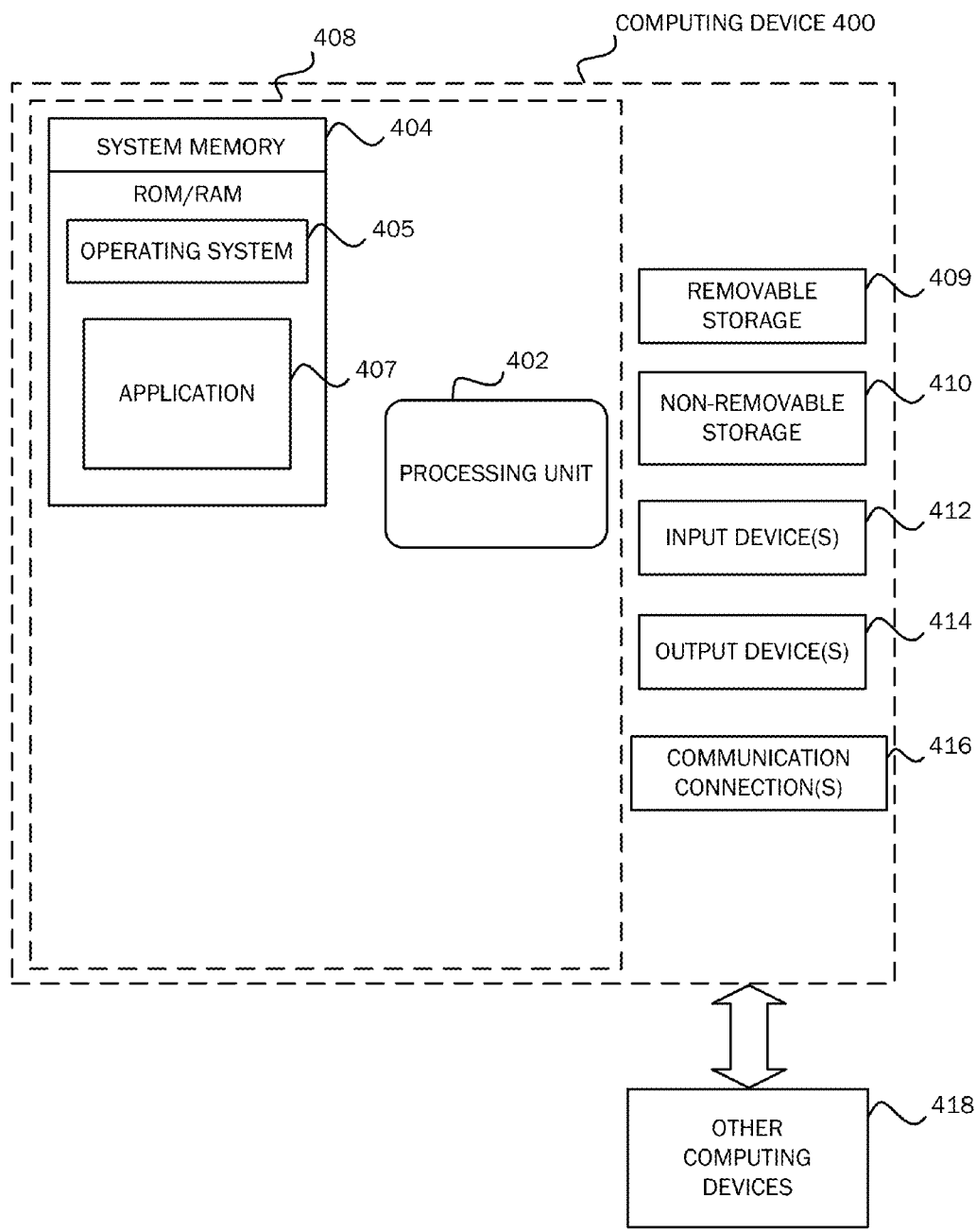
FIG. 4 is a simplified block diagram of a computing device with which various embodiments may be practiced.

FIG. 4 is a block diagram illustrating example physical components of a computing device 400 with which various embodiments may be practiced. The computing device components described below may be suitable for the enterprise server 2 referenced above with respect to FIGS. 1-3. In a basic configuration, the computing device 400 may include at least one hardware processing unit 402 and a system memory 404. Depending on the configuration and type of computing device, system memory 704 may comprise, but is not limited to, volatile (e.g. random access memory (RAM)), non-volatile (e.g. read-only memory (ROM)), flash memory, or any combination. System memory 404 may include an operating system 405 and application 407. Operating system 405, for example, may be suitable for controlling computing device 400's operation and, in accordance with an embodiment, may comprise the WINDOWS operating systems from MICROSOFT CORPORATION of Redmond, Wash. The application 407, for example, may comprise the functionality of the server application 20 described above with respect to FIGS. 1-3. It should be understood, however, that the embodiments described herein may also be practiced in conjunction with other operating systems and application programs and further, is not limited to any particular application or system.

The computing device 400 may have additional features or functionality. For example, the computing device 400 may also include additional hardware data storage devices (removable and/or non-removable) such as, for example, magnetic disks, optical disks, solid state storage devices ("SSD"), flash memory or tape. Such additional storage is illustrated in FIG. 4 by a removable storage 409 and a non-removable storage 410.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 400. Any such computer storage media may be part of the computing device 400. The computing device 400 may also have input device(s) 412 such as a keyboard, a mouse, a pen, a sound input device (e.g., a microphone) for receiving a voice input, a touch input device for receiving gestures, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
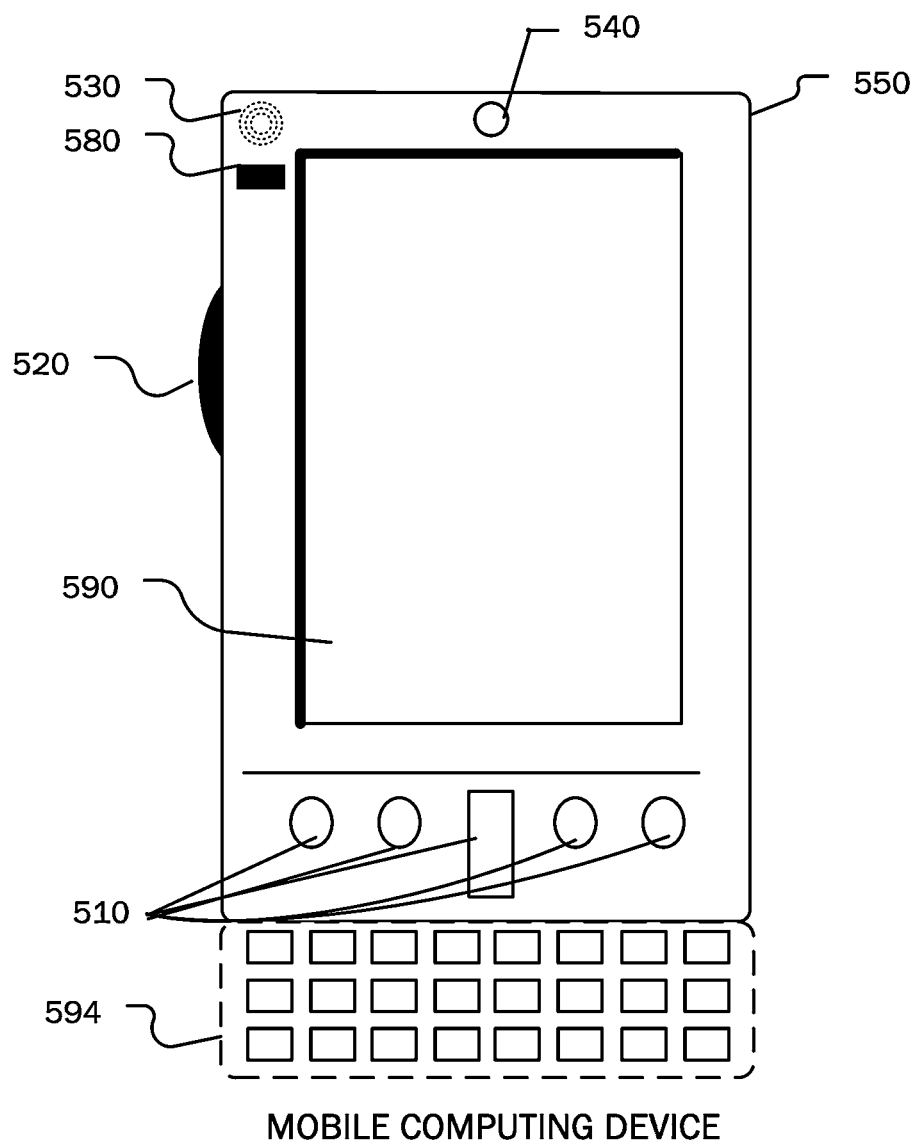
FIG. 5A is a simplified block diagram of a mobile computing device with which various embodiments may be practiced.
Figure 5B:
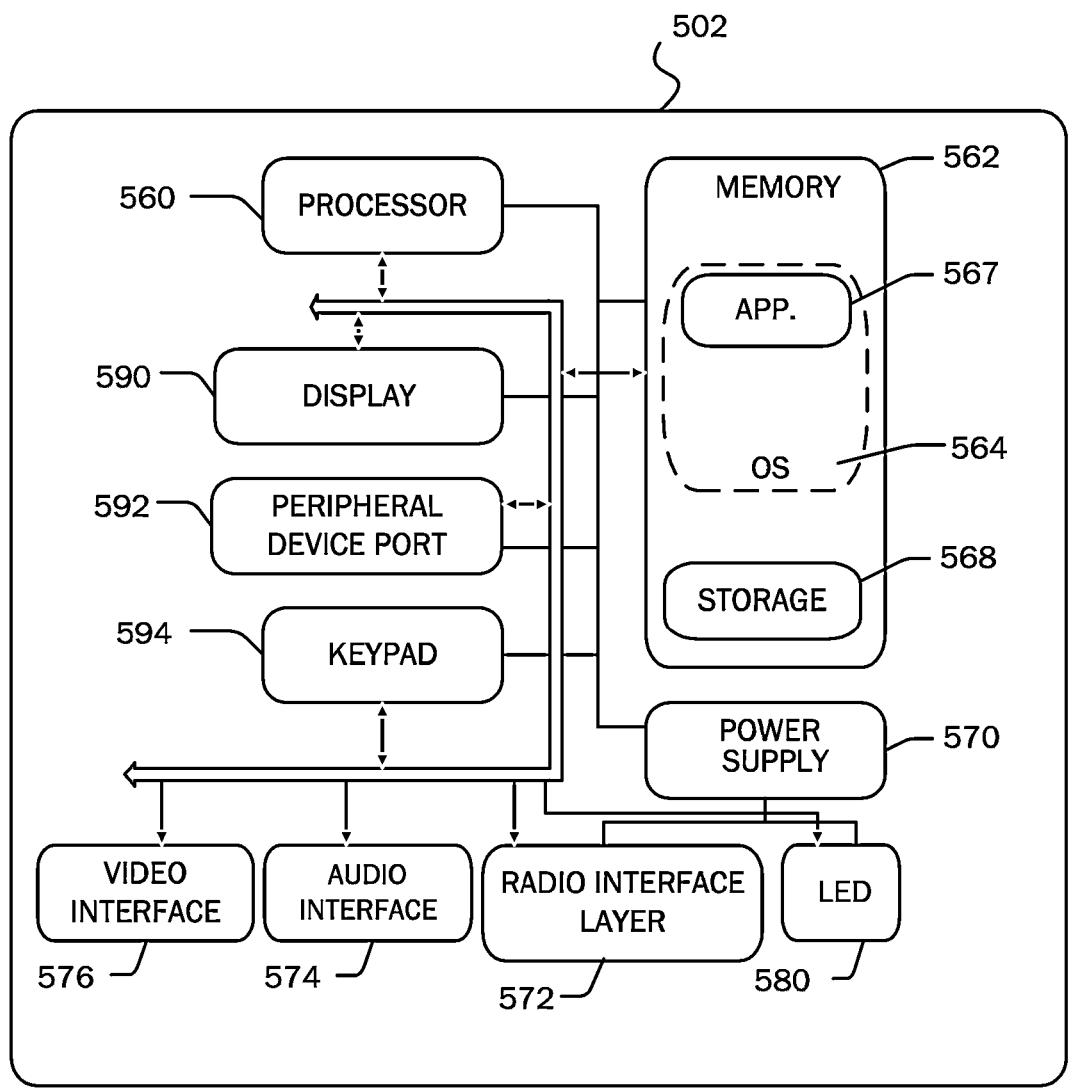
FIG. 5B is a simplified block diagram of a mobile computing device with which various embodiments may be practiced.

FIGS. 5A and 5B illustrate a suitable mobile computing environment, for example, a mobile computing device 550 which may include, without limitation, a smartphone, a tablet personal computer, a laptop computer, and the like, with which various embodiments may be practiced. With reference to FIG. 5A, an example mobile computing device 550 for implementing the embodiments is illustrated. In a basic configuration, mobile computing device 550 is a handheld computer having both input elements and output elements. Input elements may include touch screen display 525 and input buttons 510 that allow the user to enter information into mobile computing device 550. Mobile computing device 550 may also incorporate an optional side input element 520 allowing further user input. Optional side input element 520 may be a rotary switch, a button, or any other type of manual input element. In alternative embodiments, mobile computing device 550 may incorporate more or less input elements. For example, display 525 may not be a touch screen in some embodiments. In yet another alternative embodiment, the mobile computing device is a portable telephone system, such as a cellular phone having display 525 and input buttons 510. Mobile computing device 550 may also include an optional keypad 505. Optional keypad 505 may be a physical keypad or a "soft" keypad generated on the touch screen display.

Mobile computing device 550 incorporates output elements, such as display 525, which can display a graphical user interface (GUI). Other output elements include speaker 530 and LED light 526. Additionally, mobile computing device 550 may incorporate a vibration module (not shown), which causes mobile computing device 550 to vibrate to notify the user of an event. In yet another embodiment, mobile computing device 550 may incorporate a headphone jack (not shown) for providing another means of providing output signals.

Although described herein in combination with mobile computing device 550, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 5B is a block diagram illustrating components of a mobile computing device used in one embodiment, such as the mobile computing device 550 shown in FIG. 5A. That is, mobile computing device 550 can incorporate a system 502 to implement some embodiments. For example, system 502 can be used in implementing a "smart phone" or tablet computer that can run one or more applications similar to those of a desktop or notebook computer. In some embodiments, the system 502 is integrated as a computing device, such as an integrated personal digital assistant (PDA) and wireless phone.

Application 567 may be loaded into memory 562 and run on or in association with an operating system 564. The system 502 also includes non-volatile storage 568 within memory the 562. Non-volatile storage 568 may be used to store persistent information that should not be lost if system 502 is powered down. The application 567 may use and store information in the non-volatile storage 568. A synchronization application (not shown) also resides on system 502 and is programmed to interact with a corresponding synchronization application resident on a host computer to keep the information stored in the non-volatile storage 568 synchronized with corresponding information stored at the host computer. As should be appreciated, other applications may also be loaded into the memory 562 and run on the mobile computing device 550.

The system 502 has a power supply 570, which may be implemented as one or more batteries. The power supply 570 might further include an external power source, such as an AC adapter or a powered docking cradle that supplements or recharges the batteries.

The system 502 may also include a radio 572 (i.e., radio interface layer) that performs the function of transmitting and receiving radio frequency communications. The radio 572 facilitates wireless connectivity between the system 502 and the "outside world," via a communications carrier or service provider. Transmissions to and from the radio 572 are conducted under control of OS 564. In other words, communications received by the radio 572 may be disseminated to the application 567 via OS 564, and vice versa.

The radio 572 allows the system 502 to communicate with other computing devices, such as over a network. The radio 572 is one example of communication media. The embodiment of the system 502 is shown with two types of notification output devices: an LED 580 that can be used to provide visual notifications and an audio interface 574 that can be used with speaker 530 to provide audio notifications. These devices may be directly coupled to the power supply 570 so that when activated, they remain on for a duration dictated by the notification mechanism even though processor 560 and other components might shut down for conserving battery power. The LED 580 may be programmed to remain on indefinitely until the user takes action to indicate the powered-on status of the device. The audio interface 574 is used to provide audible signals to and receive audible signals from the user. For example, in addition to being coupled to speaker 530, the audio interface 574 may also be coupled to a microphone (not shown) to receive audible input, such as to facilitate a telephone conversation. In accordance with embodiments, the microphone may also serve as an audio sensor to facilitate control of notifications. The system 502 may further include a video interface 576 that enables an operation of on-board camera 540 to record still images, video streams, and the like.

A mobile computing device implementing the system 502 may have additional features or functionality. For example, the device may also include additional data storage devices (removable and/or non-removable) such as, magnetic disks, optical disks, or tape. Such additional storage is illustrated in FIG. 5B by storage 568.

Data/information generated or captured by the mobile computing device 550 and stored via the system 502 may be stored locally on the mobile computing device 550, as described above, or the data may be stored on any number of storage media that may be accessed by the device via the radio 572 or via a wired connection between the mobile computing device 550 and a separate computing device associated with the mobile computing device 550, for example, a server computer in a distributed computing network such as the Internet. As should be appreciated such data/information may be accessed via the mobile computing device 550 via the radio 572 or via a distributed computing network. Similarly, such data/information may be readily transferred between computing devices for storage and use according to well-known data/information transfer and storage means, including electronic mail and collaborative data/information sharing systems.

Figure 6:
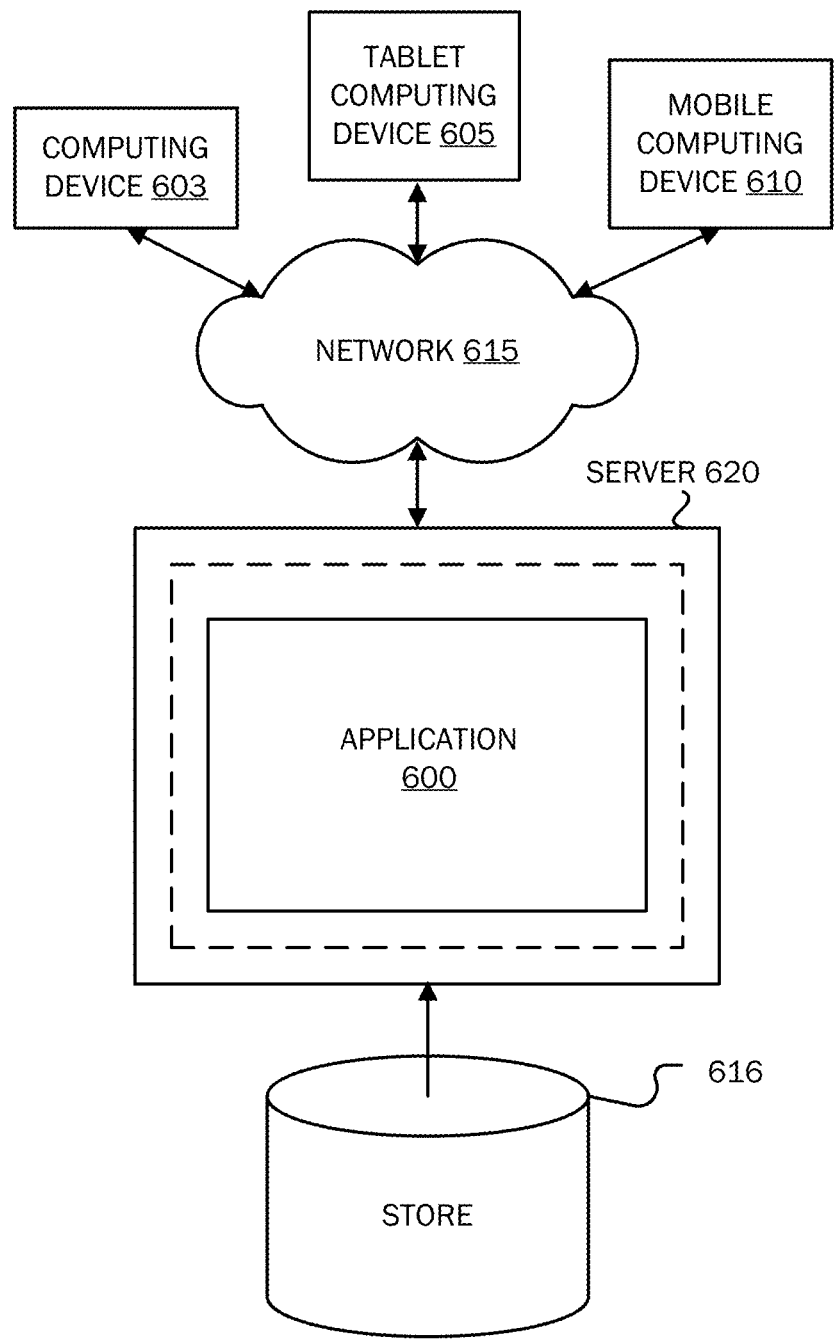
FIG. 6 is a simplified block diagram of a distributed computing system in which various embodiments may be practiced.

FIG. 6 is a simplified block diagram of a distributed computing system in which various embodiments may be practiced. The distributed computing system may include number of client devices such as a computing device 603, a tablet computing device 605 and a mobile computing device 610. The client devices 603, 605 and 610 may be in communication with a distributed computing network 615 (e.g., the Internet). A server 620 is in communication with the client devices 603, 605 and 610 over the network 615. The server 620 may store application 600 which may be perform routines including, for example, one or more of the operations in the routine 300 described above.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer-implemented method for online learning of click-through rates on federated result blocks from a plurality of federated sources, comprising: receiving, by an enterprise search engine at a computer, click-through feedback for the federated result blocks received from known federated sources in response to a query;

determining a click probability for federated block results received from unknown federated sources based on a plurality of unknown federated block features, the unknown federated sources comprising federated sources which are previously unknown to the enterprise search engine, the plurality of unknown federated block features comprising a block type ID and a query ID associated with an unknown federated source, wherein determining the click probability comprises executing a learning algorithm on a query log comprising a mapping of the block type ID, the query ID, and a performance score of the block type ID for the query ID, wherein the algorithm is based on a probit regression model that maps discrete or real-valued input features to probabilities;

predicting the click-through rate of the federated block results received from the unknown federated sources from the determined click probability;

assigning a weight of each of the federated result blocks, wherein assigning the weight comprises assigning the weight to each of the federated result blocks received from known federated sources based on the received click-through feedback and assigning the weight for the federated result blocks received from the unknown federated sources based on the predicted click-through rate;

ranking, by the enterprise search engine, the federated result blocks based on the assigned weights;

and generating, by the enterprise search engine, a search results page for displaying the ranked federated result blocks, the ranked federated result blocks being displayed in one of a plurality of hierarchical slots based on a predetermined threshold value.

2. The method of claim 1, further comprising sending the query to a plurality of federated sources.

3. The method of claim 1, wherein receiving, by the enterprise search engine, click-through feedback for the federated result blocks from of known federated sources in response to the query comprises receiving a plurality of search results in response to the query on a search engine page.

4. The method of claim 1, further comprising: checking query log to determine a frequency of at least one query term; and boosting the click probability for a federated result block when the at least one query term has a high frequency.

5. The method of claim 1, wherein generating, by the enterprise search engine, a search results page for displaying the ranked federated result blocks comprises displaying each of the federated results blocks such that they correspond to one of a plurality of unknown federated sources.

6. The method of claim 1, wherein generating, by the enterprise search engine, a search results page for displaying the ranked federated result blocks comprises displaying each of the federated results blocks such that they correspond to a reinterpretation of the query.

7. An apparatus for online learning of click-through rates on federated result blocks from a plurality of unknown federated sources, comprising: a memory for storing executable program code; and a processor, functionally coupled to the memory, the processor being responsive to computer-executable instructions contained in the program code and operative to:

receive click-through feedback for the federated result blocks received from known federated sources in response to a query;

determine a click probability for federated result blocks received from the plurality of unknown federated sources based on a plurality of unknown federated block features, the unknown federated sources comprising federated sources which are previously unknown to an enterprise search engine, the plurality of unknown federated block features comprising a block type ID and a query ID associated with each of the plurality of priori unknown federated sources, wherein the click probability is determined by executing a learning algorithm on a query log comprising a mapping of the block type ID, the query ID, and a performance score of the block type ID for the query ID;

wherein the algorithm may be based on a probit regression model that maps discrete or real-valued input features to probabilities;

predict the click-through rate of the federated block results received from the unknown federated sources from the determined click probability, wherein the algorithm is based on a probit regression model that maps discrete or real-value input features to probabilities;

assign a weight of each of the federated result blocks, wherein assigning the weight comprises assigning the weight to each of the federated result blocks received from known federated sources based on the received click-through feedback and assigning the weight for the federated result blocks received from the plurality of unknown federated sources based on the predicted click-through rate;

rank the federated result blocks based on the assigned weights; and display the ranked federated result blocks to a user, the ranked federated result blocks being displayed in one of a plurality of hierarchical slots based on a predetermined threshold value.

8. The apparatus of claim 7, wherein the processor, in receiving the click-through feedback for the federated result blocks from known federated sources in response to the query, is operative to receive a plurality of search results in response to the query on a search engine page.

9. The apparatus of claim 7, wherein the processor is further operative to: check an enterprise query log and a web query log to determine a frequency of at least one query term; and boost the click probability for a federated result block when the at least one query term has a high frequency.

10. A memory storage storing computer executable instructions which, when executed by a computer, will cause the computer to perform a method for online learning of click-through rates on federated result blocks from a plurality of unknown federated sources, the method comprising:

sending a query;

receiving, at an enterprise search engine, click-through feedback for the federated result blocks from a plurality of known federated sources in response to the query, the click-through feedback comprising a plurality of search results returned in response to the query on a search engine page;

determining a click probability for federated block results received from the plurality of unknown federated sources based on a plurality of unknown federated block features, the unknown federated sources comprising federated sources which are previously unknown to the enterprise search engine, the plurality of unknown federated block features comprising a block type ID and a query ID associated with each of the plurality of unknown federated sources, wherein determining the click probability comprises executing a learning algorithm on a querylog comprising a mapping of the block type ID, the query ID, and a performance score of the block type ID for the query ID, wherein the algorithm is based on a probit regression model that maps discrete or real-valued input features to probabilities;

predicting the click-through rate of the federated block results received from the unknown federated sources from the determined click probability;

assigning a weight of each of the federated result blocks, wherein assigning the weight comprises assigning the weight to each of the federated result blocks received from known federated sources based on the received click-through feedback and assigning the weight for the federated result blocks received from the unknown federated sources based on the predicted click-through rate;

ranking the federated result blocks based on the assigned weights;

and generating a search results page for displaying the ranked federated result blocks, the ranked federated result blocks being displayed in one of a plurality of hierarchical slots based on a predetermined threshold value.

11. The memory storage of claim 10, wherein assigning a weight to each of the federated result blocks received from known federated sources based on the received click-through feedback comprises: checking an enterprise query log and a web query log to determine a frequency of at least one query term; boosting the click probability for a federated result block when the at least one query term has a high frequency; and assigning the weight of each of the federated result blocks received from known federated sources based on the calculated click probability.

12. The method of claim 1, wherein determining the click probability for the federated result blocks received from the unknown federated sources comprises determining the click through probability using a probit regression model that maps discrete and real valued input features to probabilities.

13. The method of claim 1, wherein receiving the click-through feedback comprises receiving a click-through rate indicative of popularity of the federated result blocks.

14. The apparatus of claim 7, wherein the apparatus is an enterprise server computer.

15. The apparatus of claim 7, further comprising a server application configured to facilitate the online learning of click-through rates from the unknown federated sources.

16. The system of claim 7, wherein the ranked federated result blocks are from a same source and correspond to a reinterpretation of the query.

17. The system of claim 7, wherein the enterprise search engine is configured to support a service for an enterprise to generate queries for searching electronic documents from sources located within the enterprise and a plurality of federated sources located outside the enterprise.

18. The system of claim 7, wherein the unknown federated sources comprises third party websites external to the enterprise search engine.

19. The system of claim 1, wherein the enterprise server is configured to use the block type ID and the query ID to memorize the performance score of a block type for the query.

20. The system of claim 1, wherein each of the federated result blocks comprises a set of electronic documents retrieved in response to the query from one of the unknown federated sources, a number of electronic documents in the set of the electronic documents being user configurable.

* * * * *